United States Patent
Misawa et al.

(10) Patent No.: US 9,648,305 B2
(45) Date of Patent: May 9, 2017

(54) STEREOSCOPIC IMAGING APPARATUS AND STEREOSCOPIC IMAGING METHOD

(71) Applicant: FUJIFILM Corporation, Tokyo (JP)

(72) Inventors: Takeshi Misawa, Saitama (JP); Hiroshi Endo, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/040,033

(22) Filed: Sep. 27, 2013

(65) Prior Publication Data

US 2014/0022359 A1 Jan. 23, 2014

Related U.S. Application Data

(63) Continuation of application No. PCT/JP2011/078362, filed on Dec. 1, 2011.

(30) Foreign Application Priority Data

Mar. 31, 2011 (JP) ................................ 2011-077437

(51) Int. Cl.
*H04N 13/02* (2006.01)
*H04N 5/369* (2011.01)
(Continued)

(52) U.S. Cl.
CPC ......... *H04N 13/0296* (2013.01); *G03B 35/08* (2013.01); *H04N 5/369* (2013.01);
(Continued)

(58) Field of Classification Search
CPC ............ H04N 13/0296; H04N 13/021; H04N 13/0217; H04N 13/0257; H04N 5/369;
(Continued)

(56) References Cited

U.S. PATENT DOCUMENTS 5,835,228 A * 11/1998 Okazaki et al. .............. 356/432
6,233,003 B1 * 5/2001 Ono ............................... 348/47
(Continued)

FOREIGN PATENT DOCUMENTS

JP 10-42314 A 2/1998
JP 2001-12916 A 1/2001
(Continued)

OTHER PUBLICATIONS

International Search Report issued in PCT/JP2011/078362, dated Feb. 21, 2012.
(Continued)

*Primary Examiner* — Gims Philippe
*Assistant Examiner* — On S Mung
(74) *Attorney, Agent, or Firm* — Birch, Stewart, Kolasch & Birch, LLP

(57) ABSTRACT

At a first point in time, the amount of opening of a diaphragm is controlled in such a manner that parallax is obtained in a plurality of images that are output as a result of imaging, whereby a parallax image is acquired. At a second point in time, the diaphragm is controlled in such a manner that the amount of opening thereof is made smaller than at the first point in time, whereby a planar image is acquired. Parallax information is calculated based upon the plurality of images acquired at the first point in time, and the planar image acquired at the second point in time is created. This stereoscopic imaging apparatus creates a stereoscopic image comprising parallax information and a planar image.

14 Claims, 14 Drawing Sheets

(51) Int. Cl.
*G03B 35/08* (2006.01)
*H04N 9/04* (2006.01)

(52) U.S. Cl.
CPC .......... *H04N 5/3696* (2013.01); *H04N 9/045* (2013.01); *H04N 13/021* (2013.01); *H04N 13/0217* (2013.01); *H04N 13/0257* (2013.01); *H04N 13/0271* (2013.01)

(58) Field of Classification Search
CPC ... H04N 13/0271; H04N 5/3696; G03B 35/08
USPC .......................................................... 348/49
See application file for complete search history.

(56) References Cited

U.S. PATENT DOCUMENTS

| | | | | |
|---|---|---|---|---|
| 6,807,295 | B1* | 10/2004 | Ono | 382/154 |
| 2002/0171740 | A1* | 11/2002 | Seo | 348/207.99 |
| 2005/0159641 | A1* | 7/2005 | Kanai | 600/101 |
| 2008/0170806 | A1* | 7/2008 | Kim | 382/285 |
| 2012/0130168 | A1* | 5/2012 | Konomura | 600/111 |

FOREIGN PATENT DOCUMENTS

| | | | |
|---|---|---|---|
| JP | 2001-16611 | A | 1/2001 |
| JP | 2003-7994 | A | 1/2003 |
| JP | 2006-105771 | A | 4/2006 |
| JP | 2007279512 | A * | 10/2007 |
| JP | 2008-116309 | A | 5/2008 |
| JP | 2008-141666 | A | 6/2008 |
| JP | 2009-14445 | A | 1/2009 |
| JP | 2010-81580 | A | 4/2010 |
| JP | 2010-226500 | A | 10/2010 |
| JP | 2011-19084 | A | 1/2011 |
| JP | 2011-215498 | A | 10/2011 |

OTHER PUBLICATIONS

Written Opinion of the International Searching Authority issued in PCT/JP2011/078362, dated Feb. 21, 2012.

* cited by examiner

*Fig. 4a*          *Fig. 4b*
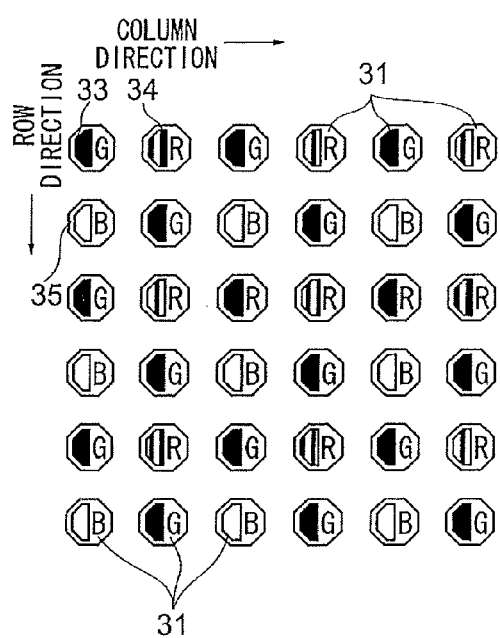
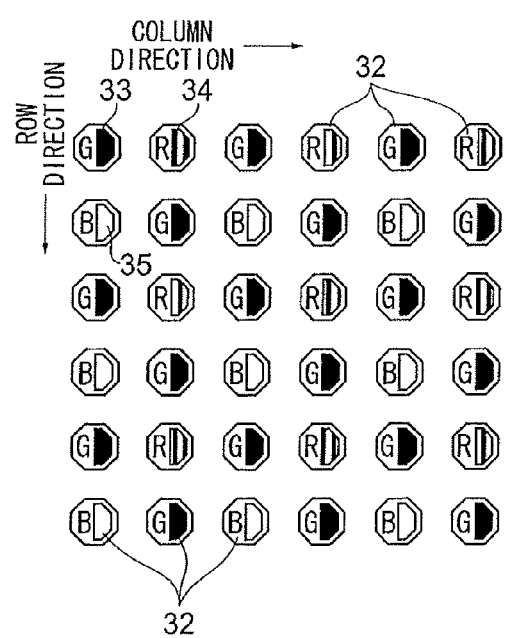

61

62

CORRESPONDING-POINT

STEREOSCOPIC IMAGING APPARATUS AND STEREOSCOPIC IMAGING METHOD

CROSS REFERENCE TO RELATED APPLICATIONS

This application is a Continuation of PCT International Application No. PCT/JP2011/078362 filed on Dec. 1, 2011, which claims priority under 35 U.S.C. §119(a) to Patent Application No. 2011-077437 filed in Japan on Mar. 31, 2011, all of which are hereby expressly incorporated by reference into the present application.

TECHNICAL FIELD

This invention relates to a stereoscopic imaging apparatus and to a stereoscopic imaging method.

BACKGROUND ART

There exists in the prior art a stereoscopic imaging apparatus for forming subject images, which have been obtained by passage through areas of different shooting lenses, on respective ones of image sensors and acquiring different viewpoint images.

In an optical system shown in FIG. 14, light rays L1 and L2 assumed to be parallel from a subject are split left and right by mirrors 151 and 161. The light rays L1 on the right side with respect to the subject are reflected at mirrors 151 and 152 and impinge upon an image forming lens 153. The right-side light rays L1 that have impinged upon the image forming lens 153 form an image on the photoreceptor surface of an image sensor 154. An image from the viewpoint of the right eye is obtained in the image sensor 154. Similarly, the light rays L2 on the left side with respect to the subject are reflected at mirrors 161 and 162 and impinge upon an image forming lens 163. The left-side light rays L2 that have impinged upon the image forming lens 163 form an image on the photoreceptor surface of an image sensor 164. An image from the viewpoint of light rays L2 that have impinged upon the image forming lens 163 form an image on the photoreceptor surface of an image sensor 164. An image from the viewpoint of the left eye is obtained in the image sensor 164. Left-and-right parallax images can be obtained. An image sensing apparatus for acquiring left-and-right parallax images in this manner has been disclosed in Japanese Patent Application Laid-Open No. 2010-81580.

Further, there is also a technique for creating and storing a parallax map, which represents depth distribution, from such parallax images. According to Japanese Patent Application Laid-Open No. 2011-19084, a depth information generating unit generates depth maps with regard to respective ones of a left-eye image and right-eye image from the left-eye image and right-eye image, which are for displaying a generated stereoscopic image. An imaging apparatus or imaging method for creating a parallax map from parallax images has been disclosed in Japanese Patent Application Laid-Open Nos. 2008-116309, 2008-141666, 2009-14445 and 2010-226500.

Examples of a stereoscopic imaging apparatuses capable of outputting a plurality of images having a phase difference by pupil division with respect to a beam of light from a single imaging optical system have been described in Japanese Patent Application Laid-Open Nos. 2003-7994, 2001-12916 and 2001-16611. For example, Japanese Patent Application Laid-Open No. 2003-7994 discloses a solid-state image sensor in which a multiplicity of pixels are arrayed on the same imaging plane for opto-electronically converting the image of a subject formed on the imaging plane to thereby generate an image signal. The solid-state image sensor is characterized in that the multiplicity of pixels are partitioned into two groups and the received-light incidence angles of the pixels in each group are made different from one another.

In the stereoscopic imaging apparatuses capable of outputting a plurality of images (of different viewpoints) having a phase difference by pupil division with respect to a beam of light from a single imaging optical system, as described in Japanese Patent Application Laid-Open Nos. 2003-7994, 2001-12916 and 2001-16611, some of the pixels of the image sensor are used in outputting a parallax image in the leftward direction and the remaining pixels are used in outputting an image in the rightward direction. If the pixels (referred to as "phase-difference pixels" below) that output left-right parallax are arrayed on the image sensor, which has a square pixel array, uniformly along the column direction (the horizontal direction), the number of horizontal pixels that can be used for each of the left and right parallax images will be half the proper pixel number which does not have pixels that output parallax. That is, in a case where the left and right images are each observed separately as two-dimensional images, the horizontal resolution will be half in comparison with a two-dimensional image that is output from the proper image sensor that does not possess phase-difference pixels.

Naturally, if two image sensors using an optical system of the kind shown in FIG. 14 are provided, then a resolution conforming to the numbers of pixels of each of the image sensors can be obtained and therefore resolution will not be sacrificed. However, a collimating optical system (not shown), the mirrors 151, 152, 153, 154 and the two image sensors 156 and 164, which originally are not required, become necessary. This is disadvantageous in terms of cost.

DISCLOSURE OF THE INVENTION

An object of the present invention is to arrange it so that stereoscopic imaging can be performed without sacrificing resolution in a stereoscopic imaging apparatus for outputting image data representing multiple images of different viewpoints by pupil division.

A stereoscopic imaging apparatus according to the present invention is characterized by comprising: a solid-state electronic imager (image sensing device) for outputting image data representing a plurality of images of different viewpoints by pupil division; a diaphragm, which is provided in front of a photoreceptor surface of the solid-state electronic imager, for adjusting quantity of light of a light beam that impinges upon the photoreceptor surface of the solid-state electronic imager; a diaphragm controller (control unit) for controlling the diaphragm at a first point in time so as to obtain an opening amount at which parallax is produced in the plurality of images represented by the image data that is output from the solid-state electronic imager, and for controlling the diaphragm at a second point in time so as to obtain an opening amount, at which the quantity of light passing through is reduced, smaller than the opening amount prevailing at the first point in time; a parallax information calculator (calculation device, calculation means) for calculating parallax information of the plurality of images using image data representing the plurality of images output from the solid-state electronic imager at the first point in time; a planar image data generator (generating device, generating means) for generating planar image data, which represents a planar image, from image data representing the plurality of images output from the solid-state electronic imager at the second point in time; and a recording controller (control device, control means) for recording on a recording medium the parallax information generated by the parallax information calculator and the planar image data generated by the planar image data generator.

The present invention also provides a stereoscopic imaging method suited to the above-described stereoscopic imaging apparatus. Specifically, the method comprises: a solid-state electronic imager outputting image data representing a plurality of images of different viewpoints by pupil division; a diaphragm, which is provided in front of a photoreceptor surface of the solid-state electronic imager, adjusting quantity of light of a light beam that impinges upon the photoreceptor surface of the solid-state electronic imager; a diaphragm controller controlling the diaphragm at a first point in time so as to obtain an opening amount at which parallax is produced in the plurality of images represented by the image data that is output from the solid-state electronic imager, and controlling the diaphragm at a second point in time so as to obtain an opening amount, at which the quantity of light passing through is reduced, smaller than the opening amount prevailing at the first point in time; a parallax information calculator calculating parallax information of the plurality of images using image data representing the plurality of images output from the solid-state electronic imager at the first point in time; a planar image data generator generating planar image data, which represents a planar image, from image data representing the plurality of images output from the solid-state electronic imager at the second point in time; and a recording controller recording on a recording medium the parallax information generated by the parallax information calculator and the planar image data generated by the planar image data generator.

In accordance with the present invention, a solid-state electronic imager outputs image data representing a plurality of images of different viewpoints by pupil division. At a first point in time, a diaphragm is controlled so as to obtain an opening amount thereof at which parallax is produced in the plurality of images represented by the image data that is output from the solid-state electronic imager. Parallax information of the plurality of images is calculated using image data representing the plurality of images output from the solid-state electronic imager at the first point in time. At a second point in time, the diaphragm is controlled so as to obtain an opening amount, at which the quantity of light passing through is reduced, smaller than the opening amount prevailing at the first point in time. Planar image data, which represents a planar image, is generated from image data representing a plurality of images output from the solid-state electronic imager at the second point in time. The calculated parallax information and the generated planar image data are recorded on a recording medium.

When the amount of opening of the diaphragm is made large so as to increase the quantity of light passing therethrough, an amount of parallax among the plurality of images represented by the image data obtained in the solid-state electronic imager is produced. Conversely, when the amount of opening of the diaphragm is made small so as to decrease the quantity of light passing therethrough, the amount of parallax among the plurality of images represented by the image data obtained in the solid-state electronic imager is reduced. Since the diaphragm is controlled at the first point in time in such a manner that an amount of parallax is produced, the amount of parallax among the plurality of images represented by the image data obtained from the solid-state electronic imager at the first point in time can be calculated. Since the diaphragm is controlled at the second point in time in such a manner that the amount of light passing therethrough is less than at the first point in time, a plurality of images substantially free of parallax are obtained. Since a planar image is generated from a plurality of images substantially free of parallax, the resolution of the generated planar image rises. When a stereoscopic image that can be viewed stereoscopically is generated from the high-resolution planar image and the calculated parallax information, a high-resolution stereoscopic image is obtained.

The apparatus may further comprise a stereoscopic image data generator (generating device, generating means) for generating stereoscopic image data, which represents a stereoscopic image capable of being viewed stereoscopically, from the planar image data generated by the planar image data generator and the parallax information calculated by the parallax information calculator. In this case, by way of example, the recording controller records the stereoscopic image data generated by the stereoscopic image data generator, instead of the planar image data and parallax information, on the recording medium, or records the stereoscopic image data generated by the stereoscopic image data generator on the recording medium in addition to the planar image data and parallax information.

The stereoscopic image data generator may have a distance information calculator (calculation device, calculation means) for calculating distance information, which represents distance from the stereoscopic imaging apparatus to a subject contained in a planar image, with regard to the planar image represented by planar image data generated in the planar image data generator from the parallax information calculated by the parallax information calculator. In this case, stereoscopic image data can be generated from the distance information calculated by the distance information calculator and the planar image data generated by the planar image data generator, by way of example.

The stereoscopic image data generator may have a distance information corrector (correction device, correction means) for correcting distance information, with regard to the planar image, calculated by the distance information calculator. In this case, stereoscopic image data can be generated from the distance information corrected by the distance information corrector and the planar image data generated by the planar image data generator, by way of example.

The stereoscopic image data generator may have a defocus processor (processing device, processing means) for defocusing an area, which represents a subject portion spaced a predetermined distance away from an in-focus subject portion, in the planar image generated by the planar image data generator. In this case, stereoscopic image data can be generated from planar image data representing the planar image that has been defocused by the defocus processor and the distance information calculated by the distance information calculator, by way of example.

The defocus processor may, for example, execute defocus processing with regard to a user-designated area in the planer image.

By way of example, the second point in time is a point in time at which a planar-image imaging command is input by a user, and the first point in time is a point in time before or after the second point in time.

The diaphragm control unit may control the opening amount of the diaphragm in such a manner that parallax is not produced among a plurality of images represented by the image data output from the solid-state electronic imager at the second point in time.

BRIEF DESCRIPTION OF THE DRAWINGS

FIG. 4a illustrates optoelectronic transducers representing a left-viewpoint image and FIG. 4b illustrates optoelectronic transducers representing a right-viewpoint image

BEST MODE FOR CARRYING OUT THE INVENTION

First, the principle of an embodiment of the present invention will be described.

Figure 1:
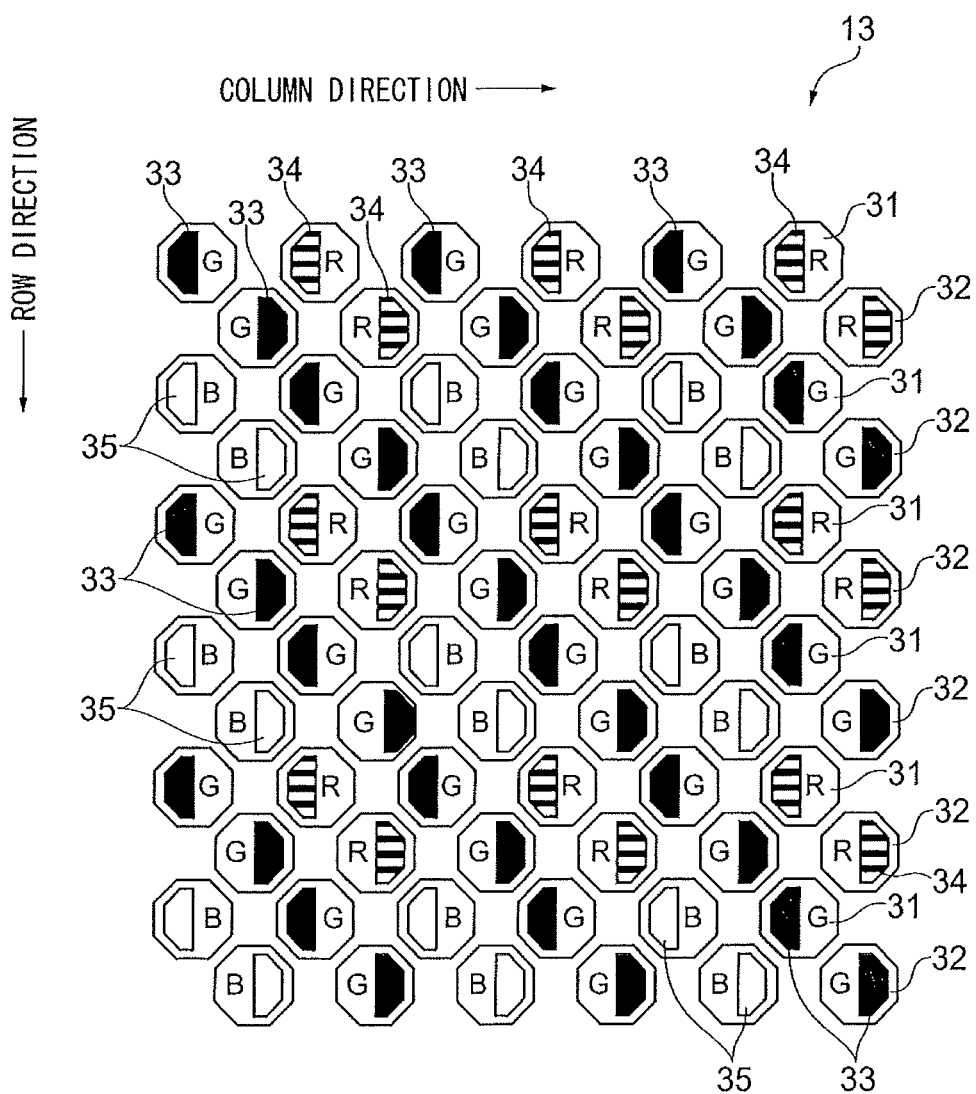
FIG. 1 illustrates the photoreceptor surface of an image sensor.

FIG. 1 illustrates a portion of the photoreceptor surface of an image sensor 13 utilized in a stereoscopic imaging apparatus according to this embodiment.

The photoreceptor surface is provided with a number of optoelectronic transducers 31 and 32 in the column and row directions. Reference numeral 31 has been assigned to the optoelectronic transducers of the odd-numbered rows, and reference numeral 32 has been assigned to the optoelectronic transducers of the even-numbered rows. The optoelectronic transducers 31 of the odd-numbered rows and the optoelectronic transducers 32 of the even-numbered rows are staggered along the column direction by ½ optoelectronic transducer 31 or 32. Formed at the opening of the photoreceptor surface of the optoelectronic transducers 31 or 32 is a red filter (indicated by reference character R) that transmits a red light component, a green filter (indicated by reference character G) that transmits a green light component, or a blue filter (indicated by reference character B) that transmits a blue light component. The green filters G and red filters R are formed alternatingly along the column direction on the photoreceptor surface of optoelectronic transducers 31 of a (4n+1)th row (where n is 0 or a positive integer) and on the photoreceptor surface of optoelectronic transducers 32 of a (4n+2)th row. The blue filters B and green filters G are formed alternatingly along the column direction on the photoreceptor surface of optoelectronic transducers 31 of a (4n+3)th row and on the photoreceptor surface of optoelectronic transducers 32 of a (4n+4)th row.

The photoreceptor surface of the optoelectronic transducers 31 and 32 is split approximately in half into left and right portions. The right side of the photoreceptor surface of the optoelectronic transducers 31 of the odd-numbered rows is shielded from light, and the left side is opened so as to be capable of receiving light. Conversely, the left side of the photoreceptor surface of the optoelectronic transducers 32 of the even-numbered rows is shielded from light, and the right side is opened so as to be capable of receiving light. In this embodiment, in order to facilitate understanding, the green filters G formed at the openings as mentioned above are indicated by black fill 33, the red filters R are indicated by a striped pattern 34, and the blue filters B are indicated by an outline 35.

Figure 2:
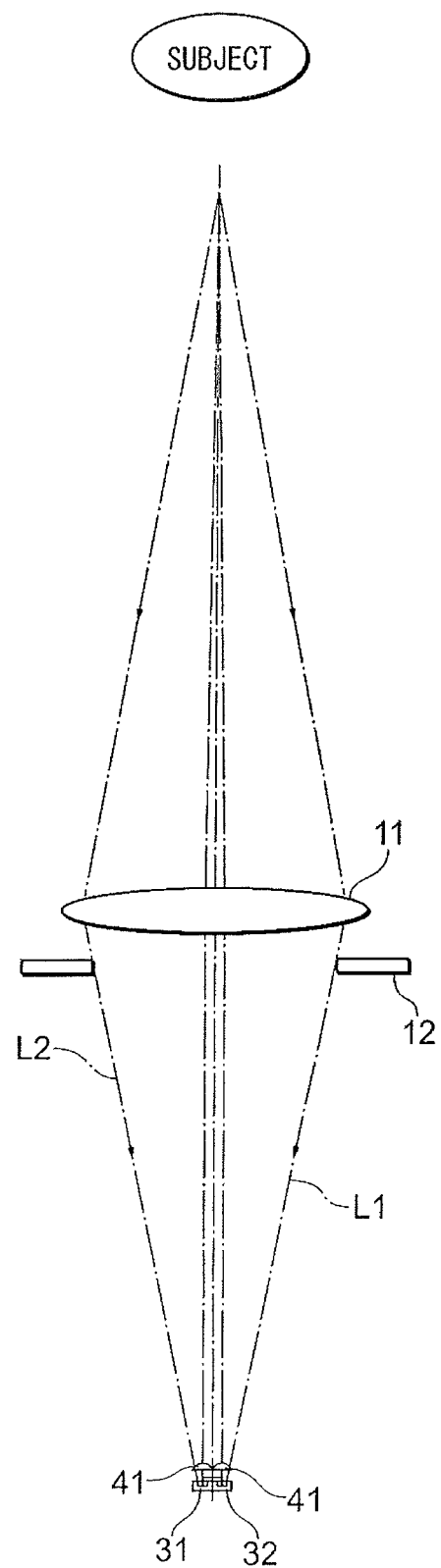
FIG. 2 illustrates the manner in which light impinges upon an optoelectronic transducer.
Figure 3A:
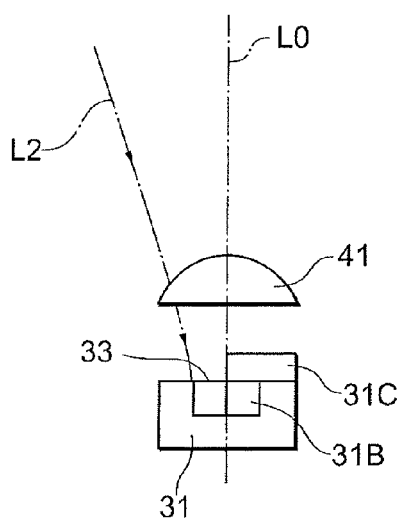
FIGS. 3a and 3b illustrate the manner in which light impinges upon an optoelectronic transducer.

FIG. 2 illustrates one optoelectronic transducer extracted from the optoelectronic transducers 31 of the odd-numbered rows and one from the optoelectronic transducers 32 of the even-numbered rows and shows the manner in which light rays representing the image of a subject impinge upon these optoelectronic transducers 31 and 32. FIG. 3a illustrates the vicinity of the optoelectronic transducer 31 in a form enlarged in comparison with FIG. 2, and FIG. 3b illustrates the vicinity of the optoelectronic transducer 32 in a form enlarged in comparison with FIG. 2.

A light ray L1 from the right side of the subject and a light ray L2 from the left side of the subject both pass through an imaging lens 11 and a diaphragm 12. A microlenses 41 is placed in front of the photoreceptor surface of each of the optoelectronic transducers 31 and 32.

With reference to FIG. 3a, a shielding member 31C is provided on the right side of a photoreceptor surface 31B of optoelectronic transducer 31 of an odd-numbered row, as mentioned above. As a result, the left side of the photoreceptor surface 31B is left open 33 (34, 35). The light ray L2 from the left side of the subject impinges upon the optoelectronic transducer 31.

Figure 3B:
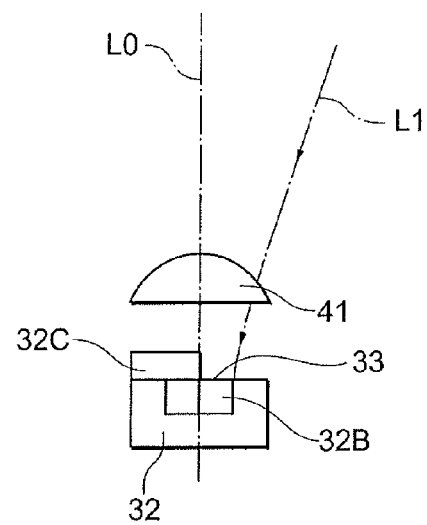

With reference to FIG. 3b, a shielding member 32C is provided on the left side of a photoreceptor surface 32B of optoelectronic transducer 32 of an even-numbered row, as mentioned above. The right side of the photoreceptor surface 32B is right open 33 (34, 35). The light ray L1 from the right side of the subject impinges upon the optoelectronic transducer 32.

FIG. 4a illustrates the optoelectronic transducers 31 of the odd-numbered rows extracted from the image sensor 13, and FIG. 4b illustrates the optoelectronic transducers 32 of the even-numbered rows extracted from the image sensor 13.

With reference to FIG. 4a, the optoelectronic transducers 31 of the odd-numbered rows are such that the right side of each photoreceptor surface is shielded whereas the left side is left open, as mentioned above. A portion of the photoreceptor surface is shielded by the above-mentioned shielding member 32C from a position offset by a predetermined amount δ from the optical-axis center L0 of the microlens 41. (Although δ may just as well be equal to 0 or negative, it is required that the light rays to the photoreceptor surface be shielded.) A light ray from the subject that has passed through the exit pupil of the imaging lens 11 passes through the opening 33 (34, 35). Image data obtained from the optoelectronic transducers 31 of the odd-numbered rows represents the image of the subject from the left-eye viewpoint.

With reference to FIG. 4b, the optoelectronic transducers 32 of the even-numbered rows are such that the left side of each photoreceptor surface is shielded whereas the right side is right open, as mentioned above. Image data obtained from the optoelectronic transducers 32 of the even-numbered rows represents the image of the subject from the right-eye viewpoint.

Image data representing the image of the subject from the left-eye viewpoint and image data representing the image of the subject from the right-eye viewpoint are thus obtained by pupil division.

Figure 5:
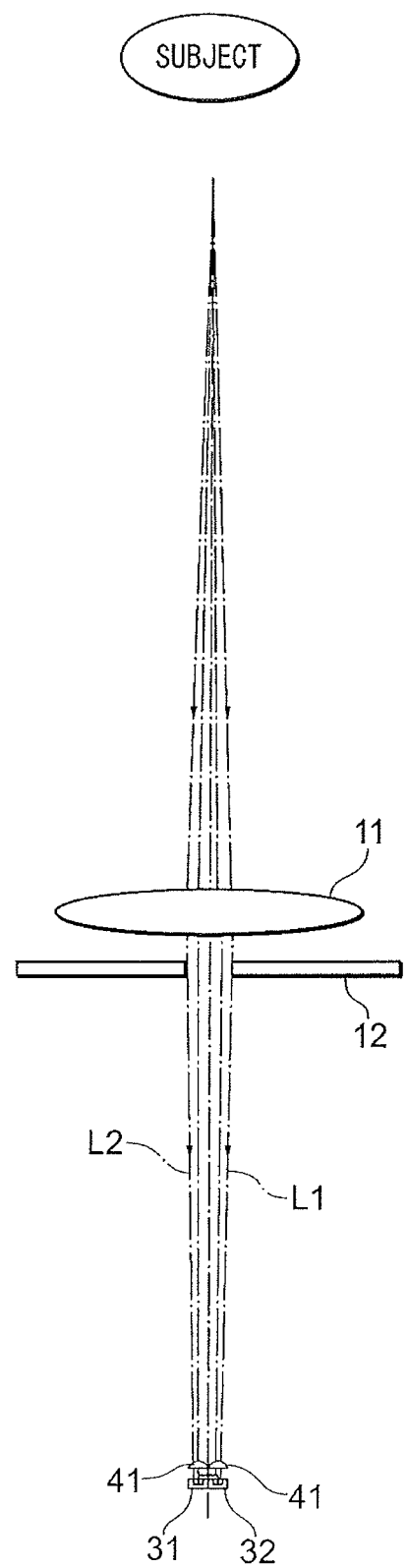
FIG. 5 illustrates the manner in which light impinges upon an optoelectronic transducer.

FIG. 5, which corresponds to FIG. 2, illustrates the manner in which light rays representing the image of a subject impinge upon the optoelectronic transducers 31 and 32.

In FIG. 5, the amount of opening of the diaphragm 12 is reduced in comparison with the amount of opening of the diaphragm 12, which is shown in FIG. 2, in such a manner that the amount of light passing through is reduced.

When the amount of opening of the diaphragm 12 becomes small, both the amount of light that impinges upon the optoelectronic transducers 31 of the odd-numbered rows and the amount of light that impinges upon the optoelectronic transducers 32 of the even-numbered rows become small. When this occurs, parallax between the image of the left-eye viewpoint and the image of the right-eye viewpoint becomes small and two images that are substantially free of parallax are obtained. A high-resolution planar image is obtained by creating one planar image using these two images.

For example, two images that are substantially free of parallax are obtained by shooting upon stopping the diaphragm 12 down to a minimum aperture F11. Strictly speaking, however, a slight amount of parallax will be occur between the two images even if the diaphragm 12 is stopped down to the maximum limit. Nevertheless, even if these two images are used to create a planar image, the parallax will be so small that breakdown will not occur.

When a single planar image is created from two images, namely a left-viewpoint image and a right-viewpoint image obtained when the amount of opening of the diaphragm 12 is large, the image breaks down owing to a large amount of parallax, but when a single planar image is created from two substantially parallax-free images, a high-resolution planar image devoid of breakdown is obtained.

In this embodiment, a high-resolution planar image is obtained from two images by making the opening amount of the diaphragm 12 small, and a left-viewpoint image and right-viewpoint image having parallax are obtained by making the opening amount of the diaphragm 12 large. More specifically, as will be described later, a parallax map is created from a left-viewpoint image and a right-viewpoint image having parallax. The parallax map represents the amount of parallax between corresponding pixels of pixels that constitute this left-viewpoint image and pixels that constitute this right-viewpoint image. A high-resolution stereoscopic image is obtained from the created parallax map and high-resolution planar image.

Figure 14:
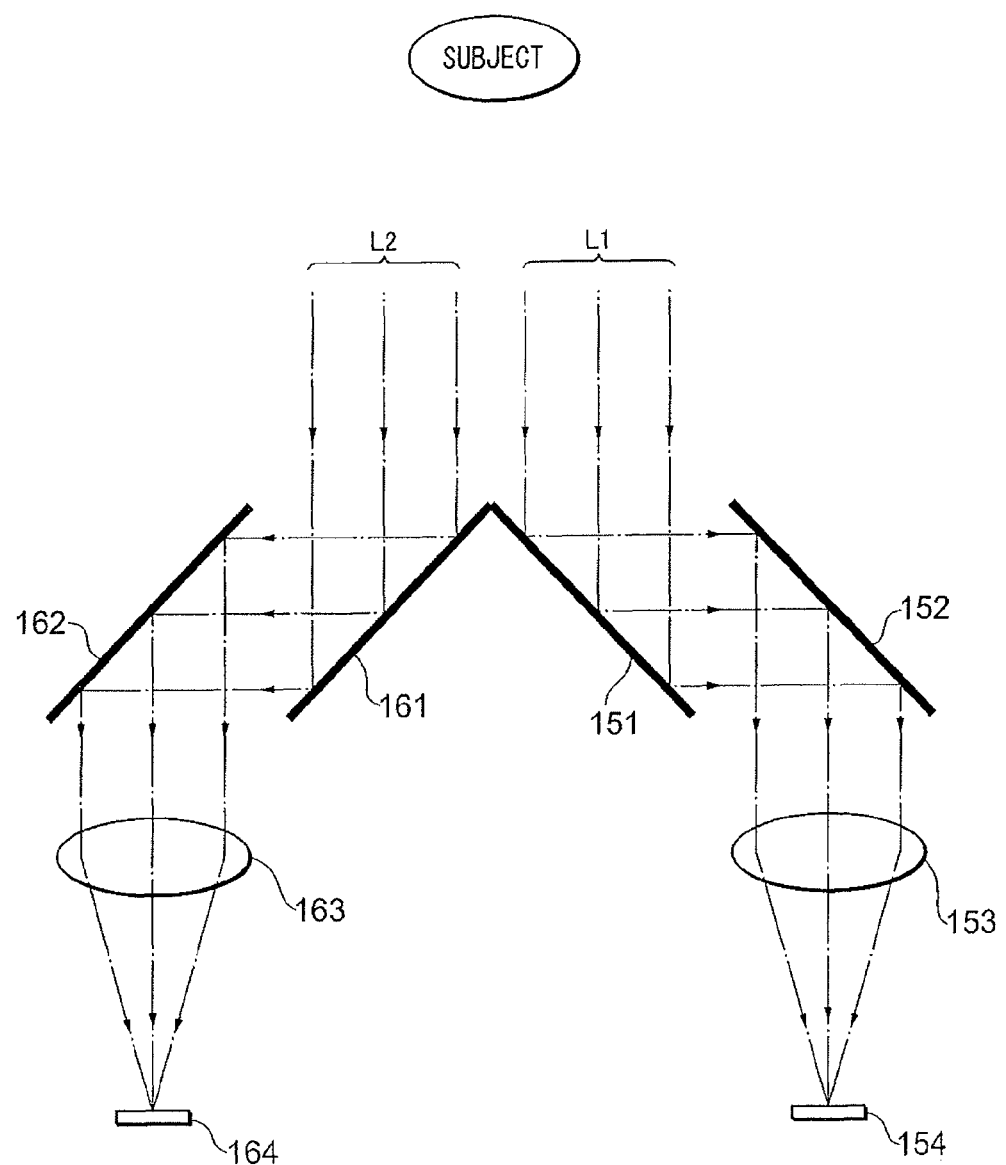
FIG. 14 illustrates the manner in which a plurality of images are obtained by pupil division according to the prior art.

Although the above-mentioned image sensor 13 is a single image sensor 13, it may just as well be a plurality of image sensors composed of image sensors having the structure shown in FIG. 4a and image sensors having the structure shown in FIG. 4b. If, in the case of the plurality of image sensors, the diagonal lengths of the image sensors are the same, image sensors having a greater number of pixels can be used, and use can be made of an image sensor having filters in a general-purpose Bayer array as illustrated in FIGS. 4a and 4b. In this case, although the optical system necessitates mirrors and the like as shown in FIG. 14, a stereoscopic image having a resolution higher in comparison with that of the conventional stereoscopic imaging apparatus is obtained.

Figure 6:
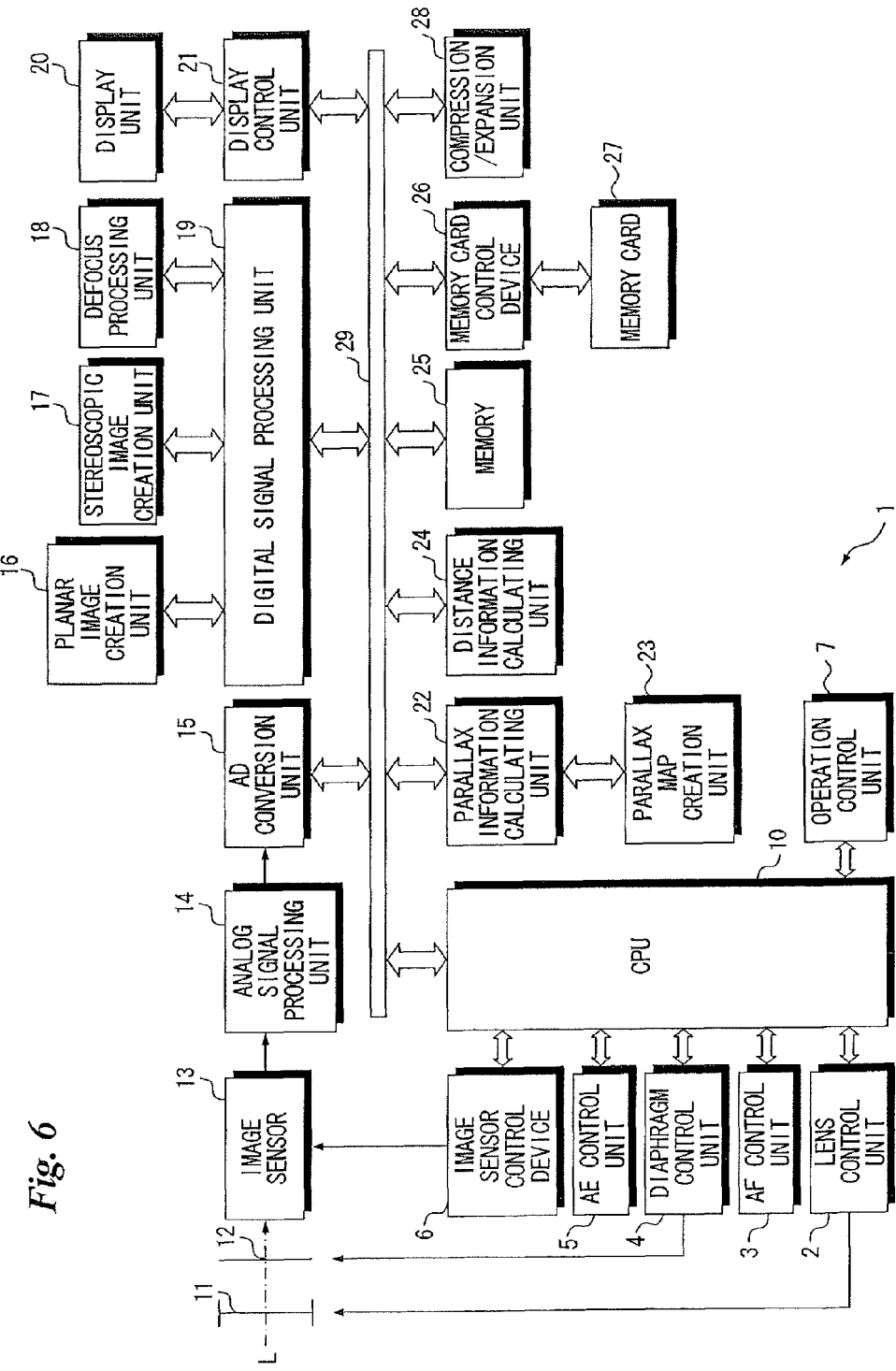
FIG. 6 is a block diagram illustrating the electrical configuration of a stereoscopic imaging apparatus.

FIG. 6 is a block diagram illustrating the electrical configuration of a stereoscopic imaging apparatus 1.

The stereoscopic imaging apparatus 1 records image data, which represents an image expressed by imaging, on a memory card 27 or in a memory 25 that includes an internal memory. The overall operation of the stereoscopic imaging apparatus 1 is controlled by a CPU (central processing unit) 10. Further, an auxiliary control device is provided with regard to each unit, and the load on the CPU 10 is alleviated by these auxiliary control devices. For example, an image sensor control device 6 controls the image sensor 13. However, an arrangement is possible in which the CPU 10 performs overall control without auxiliary control devices. Further, in a case where the memory card 27 includes a memory card control device 26, it is likely that the memory card control device 26 per se will not exist independently. Thus, the arrangement of FIG. 6 is capable of being suitably modified.

The stereoscopic imaging apparatus 1 is provided with an operation control unit 7 inclusive of a release switch, a shooting/playback changeover switch and a shooting-mode changing dial and the like. The release switch, which is an operation switch for inputting a shooting start command, is of the two-step stroke type having an S1 switch turned ON when pressed half-way, and an S2 switch turned ON when pressed fully. The shooting/playback changeover switch is a switch for switching between the shooting operation and playback operation, which causes a display unit 20 to display a still image or a moving image of a stereoscopic image (3D image) or planar image (2D image) recorded by the shooting operation. The shooting-mode changing dial is a dial that selects various shooting modes for shooting a still image and a moving image of a stereoscopic image or planar image. The operation control unit 7 includes other switches for input various instructions to the stereoscopic imaging apparatus 1. These switches and dials and the like are not only implemented by mechanical switches but are also implemented as a touch panel on the display screen of the display unit 20, by way of example.

An operation signal that is output from the operation control unit 7 is input to the CPU 10 and the CPU 10 controls various portions of the stereoscopic imaging apparatus 1 based upon the operation signal. A control program has been recorded in the memory 25. In addition, various data necessary for control executed by the CPU 10, various information concerning the image sensor 13 and parameters and the like relating to operation of the stereoscopic imaging apparatus 1 have been stored in the memory 25. The memory 25 need not be constituted by a simple memory but can be implemented as necessary by a DRAM (dynamic random-access memory), a flash memory, a VRAM (video random-access memory) or the like.

The imaging lens 11 and diaphragm 12 are provided in front of the photoreceptor surface of the image sensor 13. The diaphragm 12 has the role of changing the quantity of light and limiting the width of the light beam L. The diaphragm 12, which comprises a plurality of diaphragm blades or a set of diaphragm holes of different diaphragm systems, is controlled by a diaphragm control unit 4. For example, the diaphragm 12 is controlled in five stages in increments of 1 AV from an F-stop (F value) of F2.8 to F11. The imaging lens 11 is subjected to focusing control and zoom control, etc., by a lens control unit 2.

The light L from the subject forms an image upon the photoreceptor surface of the above-mentioned image sensor 13 upon passing through the imaging lens 11 and diaphragm 12. Although a CMOS image sensor or CCD image sensor or the like serves as the image sensor 13, the image sensor 13 is not limited to these forms of image sensor. The image sensor control device 6 controls the driving and read-out of the image sensor 13.

When the shooting mode is set, the subject is imaged by the image sensor 13. The image sensor 13 outputs a video signal representing the image of the subject. The image sensor 13 according to this embodiment is capable of capturing two subject images having different viewpoints. Video signals representing the two subject images are subjected to predetermined analog signal processing such as amplification in an analog signal processing unit 14 (although this processing unit is not necessarily required, depending upon the type of image sensor). If the image sensor 13 is a CCD, then analog signal processing such as correlated dual sampling is executed as well. In a case where the image sensor 13 is a CMOS image sensor, generally a circuit for analog signal processing conforming to the CMOS image sensor and an AD conversion unit 15 are incorporated within the image sensor 13. The video signal that has been output from the analog signal processing unit 14 is converted to digital image in the AD (analog/digital) conversion unit 15.

The digital image data obtained from the conversion is input to an AF control unit 3. In the AF control unit 3, high-frequency components of image data within a predetermined focus region (the central region of the screen, etc.) are extracted from the image data, and the extracted high-frequency components are integrated, whereby an AF evaluation value indicating the in-focus state is calculated. AF control is performed (contrast autofocus processing) by controlling a focusing lens within the imaging lens 11 by the lens control unit 2 so as to maximize the AF evaluation value. In a case where phase-difference autofocus processing is executed using image data representing two subject images having different viewpoints, a defocusing quantity is obtained based upon information indicating the phase difference between a graph representing the integrated value of image data representing a subject image from one viewpoint and a graph representing the integrated value of image data representing a subject image from the other viewpoint. The focus position of the imaging lens 11 is controlled in such a manner that the defocusing quantity becomes zero. The digital image data obtained by the conversion is input to an AE control unit 5 as well. The shutter speed (so-called "electronic shutter speed") of the image sensor 13 is decided in the AE control unit 5. In a case where assist light is necessary, an assist-light flash unit or the like controlled by an assist-light control unit may be provided or an external assist-light device may be controlled by the CPU 10 and AE control unit 5.

The digital image data is input to a display control unit 21 via a bus 29. The captured image of the subject is displayed on the display screen of the display unit 20 by controlling the display unit 20 in the display control unit 21. The display unit 20 that can be utilized is one that is capable of displaying a stereoscopic image as directional images having respective prescribed directivities by using a parallax barrier, or one capable of displaying the stereoscopic image using a lenticular lens. A planar image can be displayed on the display screen and a stereoscopic image can be displayed well, as will be described later.

When the release switch is pressed half-way (at a first point in time, for example), the diaphragm 12 opens. As mentioned above, image data representing two subject images having parallax and different viewpoints is obtained. These items of image data are input to a digital signal processing unit 19 and are subjected to predetermined digital signal processing such as various correction processing, amplification processing such as a white balance adjustment, and gamma correction processing. Image data that is output from the digital signal processing unit 19 is input to a parallax information calculating unit 22. More specifically, as will be described later, the parallax information calculating unit 22 calculates pixel-by-pixel parallax of the pixels that constitute two subject images having different viewpoints. Information representing the calculated parallax is input to a parallax map creation unit 23, which creates a parallax map.

When the release switch is pressed fully (at a second point in time, for example), the diaphragm 12 is stopped down to a small aperture at which the quantity of transmitted light declines. Image data representing two subject images having substantially no parallax (the viewpoints are approximately equal) is obtained. These items of image data are subjected to predetermined digital signal processing in the digital signal processing unit 19 and are input also to a planar image creation unit 16. Image data representing a planar image that represents one of the subject images is created in the planar image creation unit 16 from the image data representing the two subject images.

The items of data representing the parallax map created in the parallax map creation unit 23 and image data representing the planar image created in the planar image creation unit 16 are input to a stereoscopic image creation unit 17, which proceeds to create image data representing a stereoscopic image. (This is image data that is the result of adding the parallax map to the planar image data; the stereoscopic image is created from the planar image data and the parallax map.) The image data representing the created stereoscopic image is compressed in a compression/expansion unit 28. (For example, the planar image data is compressed based upon the JPEG standard.) The compressed image data representing the stereoscopic image is recorded on the memory card 27 under the control of the memory card control device 26. The image data recorded need not necessarily be compressed; RAW image data that has not been compressed may just as well be recorded on the memory card 27.

The stereoscopic imaging apparatus according to this embodiment includes a distance information calculating unit 24 and a defocus processing unit 18. Distance information is calculated by the distance information calculating unit 24 from the parallax map created in the parallax map creation unit 23. It is considered that portions for which the parallax is zero represent the image of a subject at the in-focus position of the imaging lens 11. The reason is that the in-focus portions in the two images obtained by pupil division form images at the same position on the image sensor 13, or in other words are points that coincide in the two images having different viewpoints. Similarly, since portions of the images representing a subject closer to the stereoscopic imaging apparatus 1 than the in-focus position have a point of coincidence far from the position of the image sensor 13, these portions separate and are accompanied by defocusing, as a result of which blurred images with left-right separation are obtained. Similarly, since image portions farther away from the apparatus than the in-focus position have a point of coincidence forward of the position of the image sensor 13, these portions separate and are accompanied by defocusing and separated blurred image are obtained with left-right positions being reversed with respect to an image closer to the stereoscopic imaging apparatus 1 than the in-focus position. Accordingly, by detecting corresponding points from multiple images having different viewpoints, whether the portions at the positions of the corresponding points in the image are closer to the stereoscopic imaging apparatus 1 than the in-focus position, i.e., in front, or at the in-focus position, or far from the in-focus position, can be ascertained. In other words, relative distance information can be obtained. Furthermore, if distance information concerning the in-focus position is obtained from the lens control unit 2 and information concerning the diaphragm 12 is obtained from the diaphragm control unit 4 as these items of information, then absolute position information can also be obtained. Such distance information is calculated in the distance information calculating unit 24. Further, defocus processing of the image obtained by imaging is executed in the defocus processing unit 18. These processing steps will be described in detail later.

Left-and-right-viewpoint image data and the planar image are input to the stereoscopic image creation unit 17, which detects the corresponding points between the two images in the left-and-right-viewpoint image data and planar image data and correlates the parallax information or distance information, which has been correlated with the left-and-right-viewpoint image data, with the planar image data. Since corresponding-point detection has already been carried out using the left-and-right-viewpoint image data, detecting the already detected corresponding points from the planar image data is efficient. Corresponding-point detection is performed between the left-viewpoint image data and planar image data and between the right-viewpoint image data and the planar image data. The reason for performing this detection between the respective items of viewpoint image data and the planar image data is that the planar image data also has corresponding points that correspond to viewpoint image data of only either the left eye or right eye. However, it is possible for detection of common corresponding points to be carried out simultaneously from three items of image data between the left-and-right-viewpoint image data and planar image data. Furthermore, corresponding-point detection alone can be performed independently at the same time by providing a corresponding-point detection unit (not shown), or the CPU 10 can execute corresponding-point detection processing.

When the playback mode is set, image data that has been recorded on the memory card 27 is read out and applied to the display unit 20. By applying the stereoscopic image data to the display unit 20, the stereoscopic image is displayed on the display screen of the display unit 20. Naturally, the planar image is displayed on the display screen of the display unit 20 by applying the planar image data to the display unit 20.

In the above-described embodiment, the created stereoscopic image can also be referred to as a planar image having distance (depth) information. It should be noted that since the left-and-right-viewpoint image data and planar image data are different amounts of data, as mentioned above, uniformalizing the amounts of data (numbers of pixels) is desirable in order to perform the corresponding-point detection at higher speed. Further, if a parallax map or distance map corresponding to the left-and-right-viewpoint image data has already been created by the parallax map creation unit 23, the corresponding points between the left-and-right-viewpoint image data and planar image data can be made to coincide, a parallax map or distance map corresponding to the planar image data can be created and this can be adopted as stereoscopic image data.

Since the stereoscopic image data is data in which either distance or parallax data or a distance or parallax map (referred to as "supplementary parallax information" below) has been made to correspond to planar image data, it is basically planar image data. Since the diaphragm 12 is assumed to be stopped down to, say, the minimum aperture, the planar image data is an image that approximates a so-called "omnifocal image" that is in focus from points in front of to in back of the subject to which the focal point of the imaging lens 11 has been made to agree. In order to achieve more natural stereoscopic image data, defocus processing is executed using the defocus processing unit 18. In order to obtain natural stereoscopic image data by defocusing a subject that has a large amount of parallax or that is distant from the focal-point position, the defocus processing unit 18 decides an amount of defocusing based upon the supplementary parallax information such that the greater the amount of parallax or the greater the distance from the focal-point position, the more the image data is defocused, and applies defocus processing to the planar image data. The defocus processing unit 18 may decide the amount of defocusing from the image, or it may be arranged so that the user can input the maximum amount of defocusing or an F-stop (F-value) equivalent to the amount of defocusing. The amount of defocusing can be made to reflect the preference of the user.

The stereoscopic image data is data in which distance information (a parallax map) has been added to a planar image obtained when the subject is viewed substantially from the front. As a consequence, depending upon how parallax is applied to the display control unit, an occluded region may occur. This is a region in which a far object can no longer be seen because it is obstructed by a nearby object. The following method is available in order to eliminate this:

As mentioned above, planar image data corresponds to either one or both of left-and-right-viewpoint image data at the corresponding points. This means that an area in which there is image data can be interpolated by the display control unit 21 in either the left- or right-eye parallax image data although it does not exist in the planar image data. As a result, omission of stereoscopic image data can be prevented. Further, in a case where the defocus processing unit 18 is being used to apply defocus processing to the planar image data within the stereoscopic image data, defocus processing is expanded up to the occluded region as well, defocus data is created, for example, for the in-focus position distance and for every prescribed distance range on both sides thereof, an interpolation can be performed with regard to the occluded region using the defocus image data. As a result, a more natural stereoscopic image can be displayed.

Stereoscopic image data that will be recorded on the memory card 27 or the like may be image data comprising a planar image, either parallax or distance information, or maps thereof, as mentioned above, or it may be display image data (e.g., data of two parallax images having left-right parallax) created by the display control unit 21. If this is data used in signal processing or the like, then image data comprising a planar image, either parallax or distance information, or maps thereof, is suitable. If the data is simply used in display applications, then parallax image data is suitable. Further, both types of image data may be recorded together. The recorded image data may be recorded in an image format (e.g., a multipicture format) capable of having multiple images or items of data, or it may be recorded in a general image format.

Figure 7:
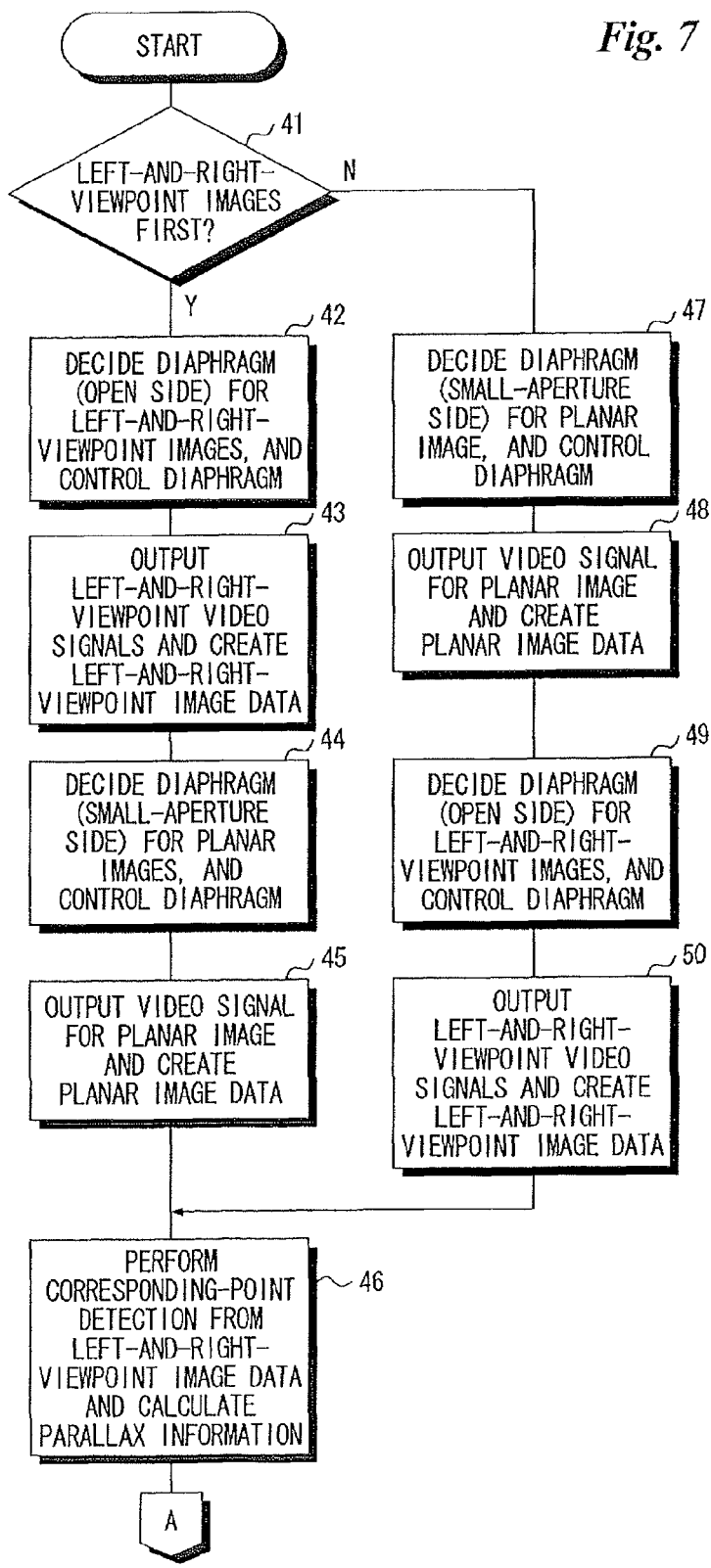
FIGS. 7 and 8 are flowcharts illustrating the processing executed by the stereoscopic imaging apparatus.
Figure 8:
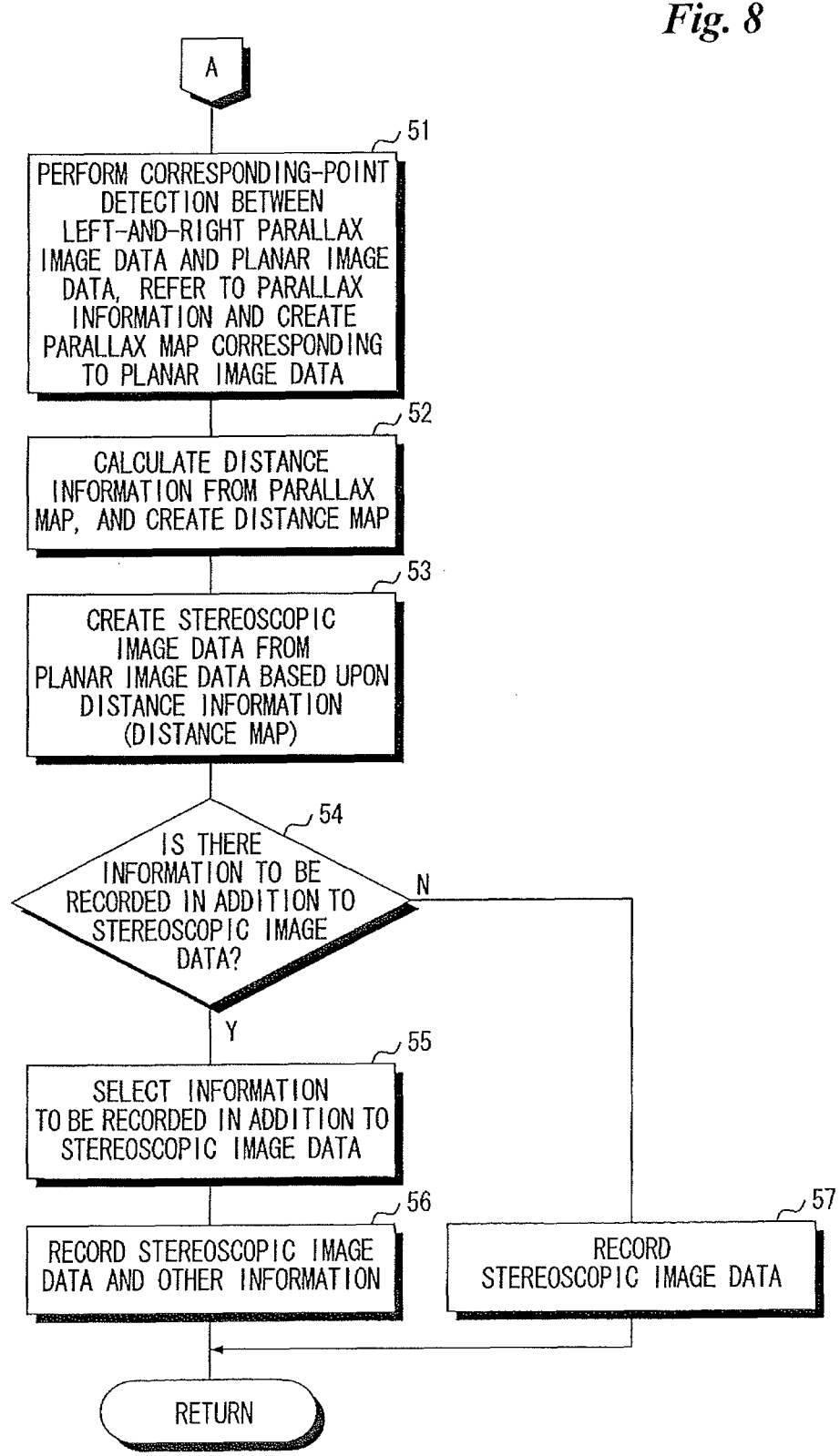

FIGS. 7 and 8 are flowcharts illustrating the processing executed by the stereoscopic imaging apparatus 1.

This processing starts in response to the shooting mode being set to "stereoscopic shooting" and a shoot command being entered.

During shooting performed in response to the command to start shooting, the CPU 10 determines whether to perform shooting of left-and-right-viewpoint images first or to perform shooting of a planar image first (step 41). Which of these is to be performed first is set beforehand by the user and is recorded in memory 25. If it is determined that shooting of left-and-right-viewpoint images is to be performed first ("YES" at step 41), then, at a first point in time (which may be when the release switch is pressed half-way, as mentioned above, but which need not be when the release switch is pressed half-way), the CPU 10 decides the aperture for shooting left-and-right-viewpoint images, namely the f-stop value that is optimum in order to obtain parallax for left and right viewpoints (the f-stop value for which the amount of aperture opening will be large, as shown in FIG. 2), and controls the diaphragm 12 so as to obtain the f-stop value decided (step 42). Control such as AE control and AF control is carried out and shooting is performed (shooting at the first point in time). The CPU 10 controls the image sensor control device 6 and reads video signals of left and right viewpoints out of the image sensor 13. Left-and-right-viewpoint image data is created from these left-and-right-viewpoint video signals (step 43).

Next, at a second point in time, (which may be when the release switch is pressed fully, as mentioned above, but which need not be when the release switch is pressed fully), the CPU 10 decides the aperture for shooting a planar image, namely the f-stop value that is optimum in order to reduce parallax to the utmost (the f-stop value for which the amount of aperture opening will be small, as shown in FIG. 5), and controls the diaphragm 12 so as to obtain the f-stop value decided (step 44). Control such as AE control and AF control is carried out and shooting is performed (shooting at the second point in time) (step 44). The CPU 10 controls the image sensor control device 6 and reads a video signal for a planar image out of the image sensor 13. Planar image data is created from the video signal for the planar image by controlling the digital signal processing unit 19, etc. (step 45).

In a case where it has not been decided to perform shooting of left-and-right-viewpoint images ("NO" at step 41), then, at the first point in time, the CPU 10 decides the f-stop value for shooting a planar image and sets the diaphragm 12 in such a manner that the f-stop value decided in obtained (step 47). After control such as AE control and AF control has been carried out, shooting is performed (shooting at the first point in time). The CPU 10 controls the image sensor control device 6, reads a video signal for a planar image out of the image sensor 13 and controls the digital signal processing unit 19, etc., to thereby create planar image data (step 48).

Next, at the second point in time, the CPU 10 decides the f-stop value for shooting left-and-right-viewpoint images and controls the diaphragm 12 so as to obtain the f-stop value decided (step 49). The CPU 10 controls the image sensor control device 6, reads video signals of left and right viewpoints out of the image sensor 13 and creates left-and-right-viewpoint image data (step 50).

Parallax information is then calculated from each of the items of left-and-right-viewpoint image data (step 46).

Figure 9A:
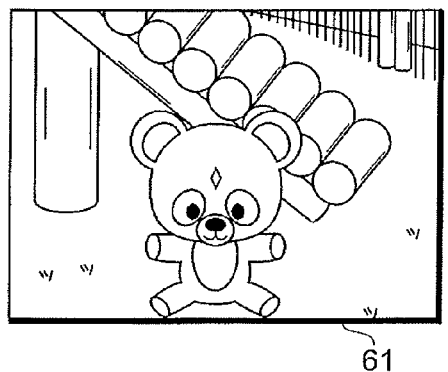
FIG. 9a illustrates a left-viewpoint image and FIG. 9b illustrates a right-viewpoint image.
Figure 9B:
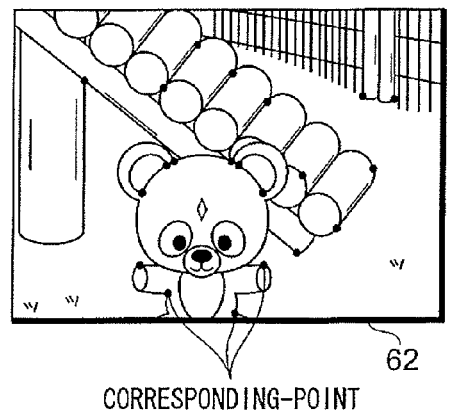

FIG. 9a illustrates an example of a left-viewpoint image 61 represented by left-viewpoint image data, and FIG. 9b illustrates an example of a right-viewpoint image 62 represented by right-viewpoint image data.

As mentioned above, corresponding points, which are pixels that correspond to respective ones of pixels that constitute the left-viewpoint image 61, are detected from within the right-viewpoint image 62. The corresponding points illustrated in the right-viewpoint image 62 are shown to be small in number in order to facilitate understanding, although it goes without saying that many more corresponding points are detected. Amounts of parallax between each of the pixels constituting the left-viewpoint image 61 and their corresponding points detected from the right-viewpoint image 62 are detected as parallax information and a parallax map is created (step 51 in FIG. 8).

Figure 10:
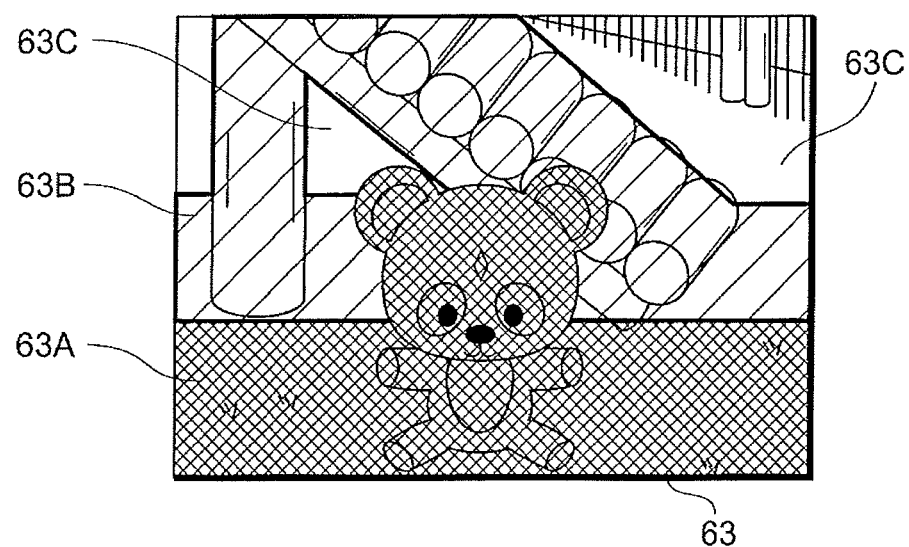
FIG. 10 illustrates a parallax map.

FIG. 10 is an example of a created parallax map 63.

The parallax map 63 includes an area 63A (indicated by the cross-hatching) of zero parallax, an area 63B (indicated by hatching) of little parallax and areas 63C (no hatching) of medium parallax. In order to facilitate understanding, the parallax map 63 has been divided into three areas of different amounts of parallax, although it goes without saying that parallax information is calculated pixel by pixel. In actuality, therefore, a continuum of parallax information is expressed two-dimensionally as the parallax map. With regard to points where corresponding points are not detected, a parallax map corresponding to planar image data is created by interpolation from parallax information that has been correlated with corresponding points in the vicinity.

When the parallax map is created, a distance map is created from the parallax map, which has been correlated with the planar image data, and focal-point information concerning the in-focus position of the imaging lens 11 (step 52 in FIG. 8). For example, as shown in FIG. 10, a distance map is created in which the area 63A is one of short distance, the area 63B is one of medium distance and the area 63C is one of long distance. It goes without saying that, with regard to the distance map as well, distances have been calculated in association with the pixels that form the planar image.

Next, stereoscopic image data representing a stereoscopic image is created from the planar image data and distance map (step 53 in FIG. 8). After the distance map is created from the parallax map, the stereoscopic image is created using the distance map. However, the stereoscopic image can be created using the parallax map even if the distance map is not created. The reason for this is that, whereas the parallax information (parallax map) consists of relative values from the in-focus position, the distance information (distance map) is only a difference, namely an absolute value. For example, to obtain the stereoscopic image, two images having left-right parallax are created and these two images can be displayed by controlling the display control unit 21 and using the display unit 20.

In a case where, in addition to stereoscopic image data, there is information (e.g., parallax information) to be recorded ("YES" at step 54), the information to be recorded in addition to the stereoscopic image data is selected (step 55). The content of the selected information may be selected beforehand by the user and recorded in the memory 25 or may be selected at the time of recording. The selected information is recorded together with the stereoscopic image data in a data recording area of the memory 25 or is recorded on the memory card 27 by controlling the memory card control device 26 (step 56). If it is determined that there is no information to be recorded besides the stereoscopic image data ("NO" at step 54), then the stereoscopic image data is recorded on the memory card 27 or the like without other information being recorded (step 57). Other information (only a planar image and parallax information, etc.) can be recorded without recording stereoscopic image data.

The foregoing is an embodiment of taking a stereoscopic still picture but application to a stereoscopic moving picture also is possible. In this case, it becomes necessary to switch at high speed between a diaphragm for left-and-right-viewpoint images and a diaphragm for a planar image. However, implementation is possible by using a diaphragm such as one that employs PLZT rather than a mechanical diaphragm.

Figure 11A:
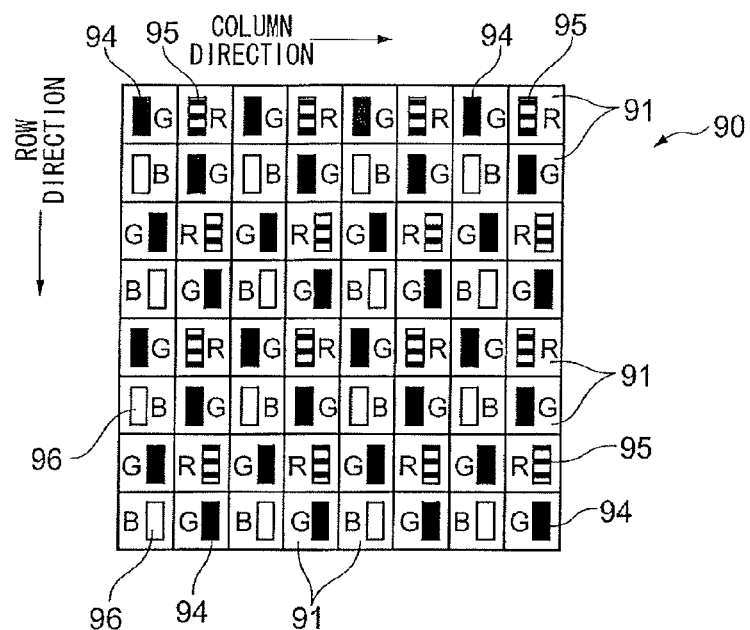
FIG. 11a illustrates the photoreceptor surface of an image sensor.
Figure 11B:
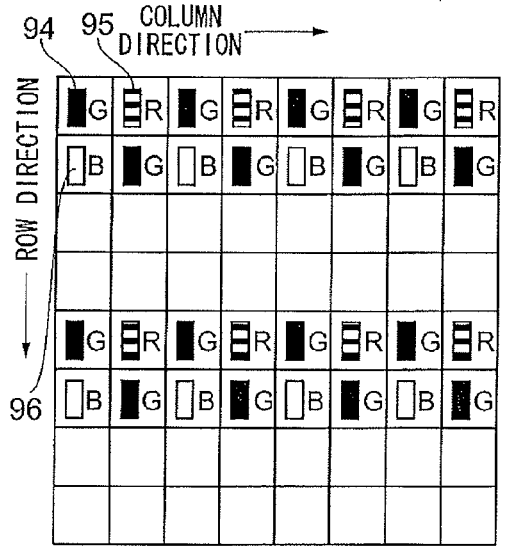
FIG. 11b illustrates optoelectronic transducers representing a left-viewpoint image and FIG. 11c illustrates a right-viewpoint image.
Figure 11C:
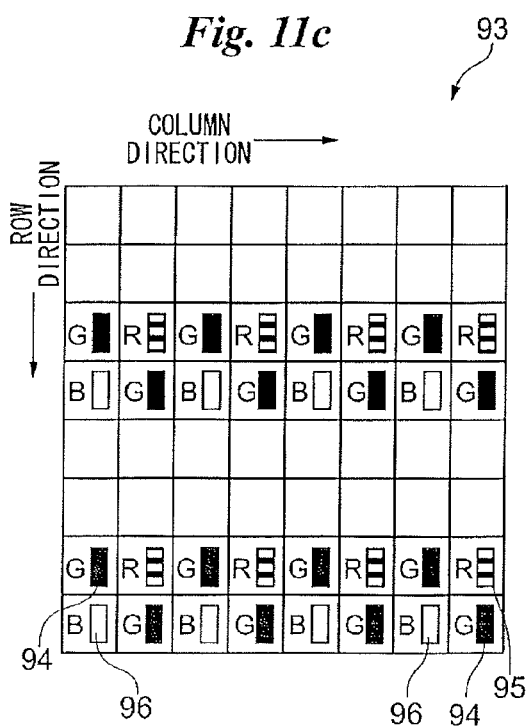

FIGS. 11a, 11b and 11c illustrate a modification. FIG. 11a, which corresponds to FIG. 1, shows the photoreceptor surface of an image sensor 90, FIG. 11b, which corresponds to FIG. 4a, shows optoelectronic transducers representing a left-viewpoint image, and FIG. 11c, which corresponds to FIG. 4b, shows optoelectronic transducers representing a right-viewpoint image.

With reference to FIG. 11a, a number of optoelectronic transducers 91 are arrayed on the image sensor 90 along the column and row directions. In this modification, the optoelectronic transducers 91 of (4n+1)th and (4n+2)th rows have the right side of their photoreceptor area shielded from light and have the left side of their photoreceptor area left open. The optoelectronic transducers 91 of (4n+3)th and (4n+4)th rows have the left side of their photoreceptor area shielded from light and have the right side of their photoreceptor area right open. Formed at the opening of the optoelectronic transducers 91 is a red filter R having a characteristic that transmits the red light component, a green filter G having a characteristic that transmits the green light component, or a blue filter B having a characteristic that transmits the blue light component. As in the above-described embodiment, the green filters G are indicated by black fill 94, the red filters R are indicated by a striped pattern 95, and the blue filters B are indicated by an outline 96. This filter array is referred to as the so-called "Bayer array".

The optoelectronic transducers 91 of the (4n+1)th and (4n+2)th rows have the right side of their photoreceptor area shielded from light. Therefore, when the optoelectronic transducers 91 of the (4n+1)th and (4n+2)th rows are extracted, as shown in FIG. 11b, an image obtained based upon the extracted optoelectronic transducers 91 represents a left-viewpoint image.

The optoelectronic transducers 91 of the (4n+3)th and (4n+4)th rows have the left side of their photoreceptor area shielded from light. Therefore, when the optoelectronic transducers 91 of the (4n+3)th and (4n+4)th rows are extracted, as shown in FIG. 11c, an image obtained based upon the extracted optoelectronic transducers 91 represents a right-viewpoint image.

It may be arranged to make use of two image sensors, namely the image sensor having the structure shown in FIG. 11b and the image sensor having the structure shown in FIG. 11c.

In the foregoing embodiment, a left-viewpoint image of a subject and a right-viewpoint image of the subject are obtained by shielding either the left side or right side of each of the optoelectronic transducers 91. However, image data representing four images having different viewpoints are obtained by arranging the image sensor 90 so as to shield or open the photoreceptor surface of the optoelectronic transducers 91 such that left side ¼, left side ¼ to ½, left side ½ to ¾ and right side ¼ are shielded or opened. It is possible to further increase the number of viewpoints in similar fashion.

In the foregoing embodiment, the optic axis of the microlens 41 coincides with the center of the photoreceptor area, but the two need not necessarily coincide. Even if the optic axis of the microlens 41 is offset from the center of the photoreceptor area, the light that impinges upon the photoreceptor area need only be limited. Furthermore, an arrangement which may be used is one in which, by providing a single microlens 41 for two or four adjacent optoelectronic transducers, the light that impinges upon each optoelectronic transducer is limited. In this case, the advantages are that, with the exception of the microlens 41, an ordinary image sensor can be used, and that the image sensor can be created upon changing the microlens step in the manufacturing process. Furthermore, the light beam may be subjected to pupil division by mirrors, as exemplified in FIG. 14. In this case, it is unnecessary to arrange it so that the left side or right side of the optoelectronic transducers is shielded. In the foregoing embodiment, application is possible to all stereoscopic imaging apparatuses in which multiple subject images having different viewpoints can be obtained by pupil division.

Figure 12:
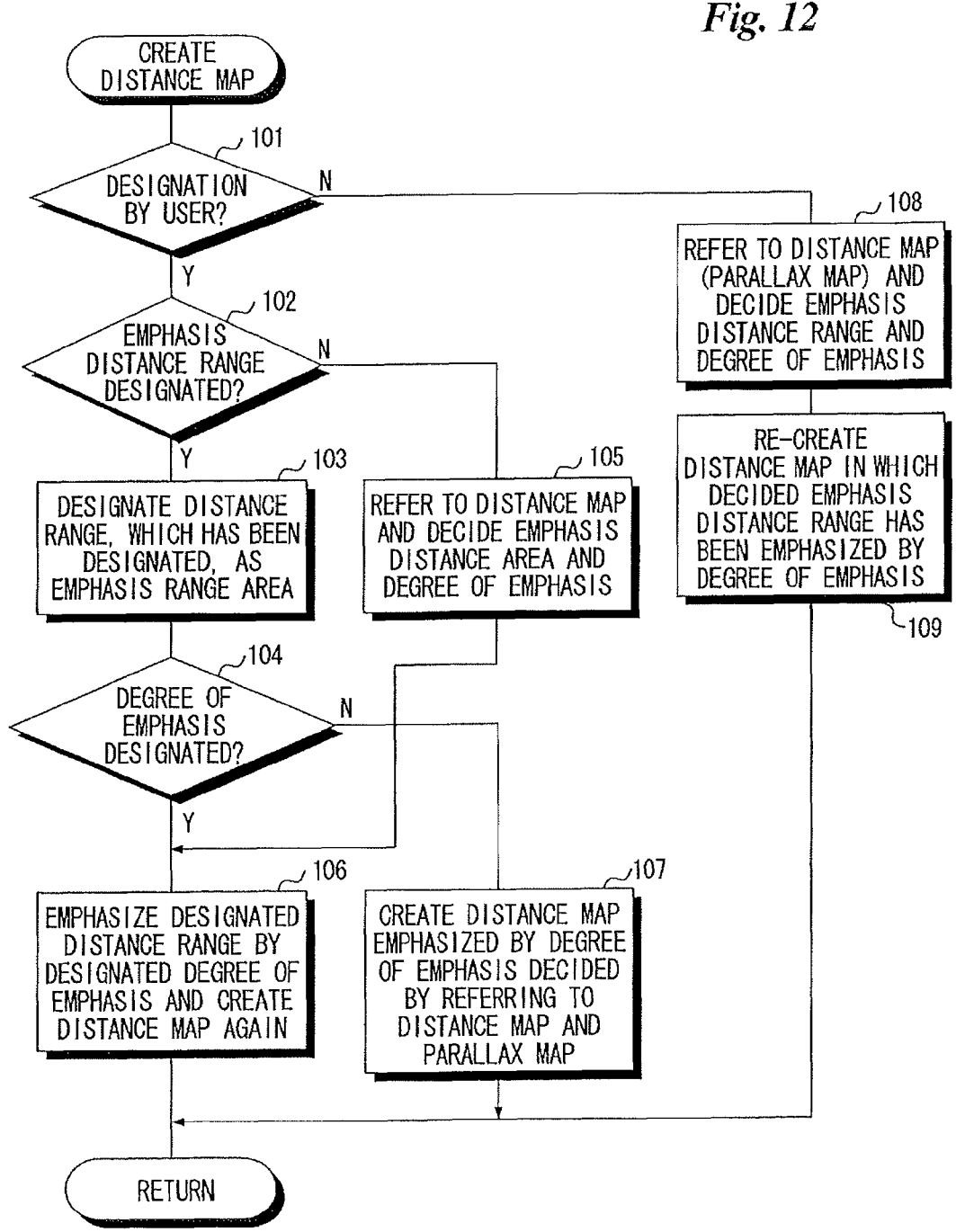
FIG. 12 is a flowchart illustrating distance map creation processing.

FIG. 12, which illustrates a modification, is a flowchart showing distance map creation processing (the processing procedure of step 52 in FIG. 8).

In the foregoing embodiment, the stereoscopic image data created by the stereoscopic imaging apparatus 1 is composed of planar image data and a distance map. Since the parallax information is specific to the imaging apparatus, the distance calculated from parallax is distance between the stereoscopic imaging apparatus and the subject at the time of shooting. In a case where a comparatively remote subject is shot as the main subject, there will be instances where the difference in distance between the main subject and the background is small and the stereoscopic effect of the stereoscopic image displayed by the created stereoscopic image data is insufficient. In this modification, distance emphasis processing (distance correction processing) is possible. In a case where the difference in distance between the main subject and the background is small and another subject is not included, the stereoscopic effect of the stereoscopic image will be insufficient, as mentioned above. It is preferred, therefore, that reference be made to a distance map and that processing be executed for emphasizing the differences (distance differences) in distances contained in overall stereoscopic vision. Further, in a case where the distance between the background and the main subject is short, it is preferred that processing executed for enlarging the distance only of the background (by moving farther into the distance). Further, in a case where it is desired to emphasize the stereoscopic effect of a subject at a specific distance within the stereoscopic image, it is possible to perform emphasis in response to a designation by the user. Distance emphasis is performed by combining emphasis of differences in distance and emphasis of distance.

Whether a user designation relating to distance emphasis processing has been made is determined (step 101). If there is a designation by the user ("YES" at step 101), it is determined whether a designation of an emphasis distance range has been made by the user (step 102). If the user has designated an emphasis distance range ("YES" at step 102), then distance information in the designated distance range is designated as the emphasis distance area (step 103). Next, it is determined whether a degree of distance emphasis has been designated (step 104). If a degree of distance emphasis has been designated ("YES" at step 104), then designated distance range is emphasized at the designated degree of emphasis and a distance map is created again (step 106).

If there is no user designation of degree of emphasis ("NO" at step 102), then an emphasis distance range and degree of emphasis are decided by referring to a distance map. For example, a distance distribution calculated from the distance map is compared with a distance distribution of standard stereoscopic image data and the emphasis distance and degree of emphasis are decided. The decide distance range is emphasized by the decided degree of emphasis and the distance map is created again (step 106).

If there is no designation of degree of emphasis ("NO" at step 104), then the emphasis distance range calculated from the distance map and the overall distance distribution are compared with the distance distribution of the standard stereoscopic image data and the degree of emphasis is decided. A distance map for which the already designated emphasis distance range has been emphasized by the decided degree of emphasis is created again (step 107).

If there is no designation by the user ("NO" at step 101), then an emphasis distance range is decided by referring to the distance map (step 108). The decided distance range is emphasized by the decided degree of emphasis and a distance map is created again (step 109). The distance map thus re-created and planar image data are recorded on the memory card 27 or the like as stereoscopic image data. Naturally, left-viewpoint image data and right-viewpoint image data may be created from the re-created distance map and the planar image data, and the created left-viewpoint image data and right-viewpoint image data may be recorded on the memory card 27 as stereoscopic image data.

Figure 13:
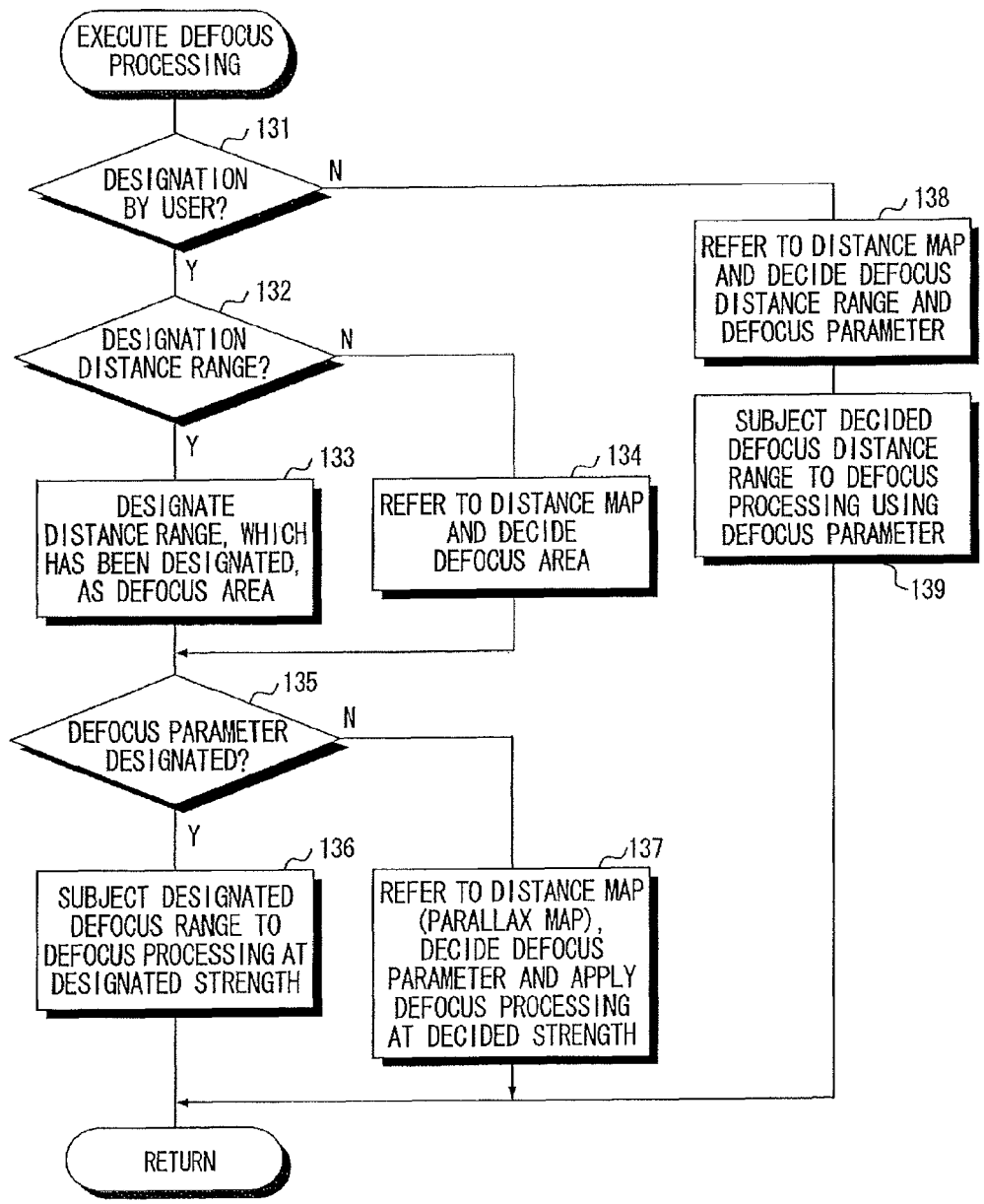
FIG. 13 is a flowchart illustrating defocus processing.

FIG. 13, which illustrates another modification, is a flowchart showing defocus processing.

In the foregoing embodiment, stereoscopic image data created by the stereoscopic imaging apparatus is based upon planar image data and a distance map. Since the diaphragm 12 is stopped down when shooting is performed in order to acquire the planar image data, a stereoscopic image represented by stereoscopic image data approximates a so-called "omnifocal image" and becomes image data of an image that is in focus from points shallow to deep. On the other hand, when a human views a subject stereoscopically, "blurring" is an important factor and the stereoscopic effect is perceived owing to blurring of subjects other than the subject that has been brought into focus. Further, since shooting is performed upon opening the diaphragm 12 when left-and-right-parallax images are captured by the stereoscopic imaging apparatus 1 of this embodiment, the left-and-right-viewpoint images represented by the left-and-right-viewpoint image data are such that a subject having a large amount of parallax (a subject spaced away from the in-focus distance) is blurred. Since the stereoscopic image represented by the stereoscopic image data capable of being acquired by the stereoscopic imaging apparatus of this embodiment approximates an omnifocal image, as mentioned above, a natural stereoscopic image is obtained by applying defocus processing to the image of a subject spaced away from the in-focus position in the manner of left-and-right-viewpoint images represented by the left-and-right-viewpoint image data.

The processing shown in FIG. 13 is executed between steps 52 and 53 in FIG. 8.

First, whether a user designation relating to defocus processing has been made is determined (step 131). If there is a designation by the user ("YES" at step 131), it is determined whether a designation of a defocus distance range has been made by the user (step 132). If the user has designated a defocus distance range ("YES" at step 132), then the area of planar image data that corresponds to the designated defocus distance range of the distance map is designated as a defocus area (step 133). If there is no user designation of a defocus distance range ("NO" at step 132), then a defocus distance area and degree of emphasis are decided by referring to a distance map (step 134). For example, reference is had to the distance map and processing is executed such as for setting a subject, which is a fixed distance away from the in-focus main subject, in the defocus area.

Next, it is determined whether a defocus parameter has been designated (step 135). If a defocus parameter has been designated ("YES" at step 135), then the designated defocus distance range of the stereoscopic image is subjected to defocus processing using the designated defocus parameter (step 136). If a defocus parameter has not been designated ("NO" at step 135), then a defocus parameter is decided by referring to a distance map of the designated or decided defocus area (step 137). For example, the defocus parameter is decided as by making it one where the strength of defocusing is proportional to a function of distance. The designated defocus distance range of the stereoscopic image data is subjected to defocus processing using the designated defocus parameter.

If there is no designation by the user ("NO" at step 131), then a defocus distance range and defocus parameter are decided by referring to the distance map (step 138). The decided defocus distance range is subjected to defocus processing using the decided defocus parameter (step 139).

The planar image data thus subjected to defocus processing and the distance map are recorded on the memory card 27 as stereoscopic image data. Naturally, it may be arranged so as to create left-viewpoint image data and right-viewpoint image data from the defocused planar image data and distance map, and to record the created left-viewpoint image data and right-viewpoint image data on the memory card 27.

The invention claimed is:

1. A stereoscopic imaging apparatus comprising:
a solid-state electronic imager for outputting image data representing a plurality of images of different viewpoints by pupil division, wherein obtaining said plurality of images of different viewpoints by pupil division means that said plurality of images are produced by one optical system in the same one exposure, said one optical system being said solid-state electronic imager;
a diaphragm, which is provided in front of a photoreceptor surface of said solid-state electronic imager, for adjusting quantity of light of a light beam that impinges upon the photoreceptor surface of said solid-state electronic imager;
a diaphragm controller for controlling said diaphragm at a first point in time so as to obtain an opening amount at which parallax is produced in the plurality of images represented by the image data that is output from said solid-state electronic imager, and for controlling said diaphragm at a second point in time so as to obtain parallax less than the parallax of the first point in time;
a parallax information calculator for calculating parallax information of the plurality of images using image data representing the plurality of images output from said solid-state electronic imager at said first point in time;
a planar image data generator for generating planar image data, which represents a planar image, from image data representing the plurality of images output from said solid-state electronic imager at said second point in time; and a recording controller for recording on a recording medium the parallax information generated by said parallax information calculator and the planar image data generated by said planar image data generator, wherein said solid-state electronic imager includes a number of optoelectronic transducers in the column and row directions, and the right side of the photoreceptor surface of the optoelectronic transducers of the odd-numbered rows is shielded from light, and the left side of the photoreceptor surface of the optoelectronic transducers of the even-numbered rows is shielded from light, or the right side of the photoreceptor surface of the optoelectronic transducers of the even-numbered rows is shielded from light, and the left side of the photoreceptor surface of the optoelectronic transducers of the odd-numbered rows is shielded from light.

2. The stereoscopic imaging apparatus according to claim 1, further comprising a stereoscopic image data generator for generating stereoscopic image data, which represents a stereoscopic image capable of being viewed stereoscopically, from the planar image data generated by said planar image data generator and the parallax information calculated by said parallax information calculator;

wherein said recording controller records the stereoscopic image data generated by said stereoscopic image data generator, instead of said planar image data and said parallax information, on the recording medium, or records the stereoscopic image data generated by said stereoscopic image data generator on the recording medium in addition to said planar image data and said parallax information.

3. The stereoscopic imaging apparatus according to claim 2, wherein said stereoscopic image data generator has distance information calculator for calculating distance information, which represents distance from the stereoscopic imaging apparatus to a subject contained in a planar image, with regard to the planar image represented by planar image data generated in said planar image data generator from the parallax information calculated by said parallax information calculator;

stereoscopic image data being generated from the distance information calculated by said distance information calculator and the planar image data generated by said planar image data generator.

4. The stereoscopic imaging apparatus according to claim 3, wherein said stereoscopic image data generator has a distance information corrector for correcting distance information, with regard to the planar image, calculated by said distance information calculator;

stereoscopic image data being generated from the distance information corrected by said distance information corrector and the planar image data generated by said planar image data generator.

5. The stereoscopic imaging apparatus according to claim 3, wherein said stereoscopic image data generator has a defocus processor for defocusing an area, which represents a subject portion spaced a predetermined distance away from an in-focus subject portion, in the planar image generated by said planar image data generator;

stereoscopic image data being generated from planar image data representing the planar image that has been defocused by said defocus processor and the distance information calculated by said distance information calculator.

6. The stereoscopic imaging apparatus according to claim 5, wherein said defocus processor executes defocus processing with regard to a user-designated area in the planer image.

7. The stereoscopic imaging apparatus according to claim 1, wherein the second point in time is a point in time at which a planar-image imaging command is input by a user; and the first point in time is a point in time before said second point in time.

8. The stereoscopic imaging apparatus according to claim 1, wherein the second point in time is a point in time at which a planar-image imaging command is input by a user; and the first point in time is a point in time after said second point in time.

9. The stereoscopic imaging apparatus according to claim 1, wherein said diaphragm controller controls the opening amount of said diaphragm in such a manner that parallax is not produced among the plurality of images represented by image data output from said solid-state electronic imager at the second point in time.

10. A stereoscopic imaging method comprising:

outputting image data representing a plurality of images of different viewpoints by pupil division using a solid-state electronic imager, wherein obtaining said plurality of images of different viewpoints by pupil division means that said plurality of images are produced by one optical system in the same one exposure, said one optical system being said solid-state electronic imager;

adjusting quantity of light of a light beam that impinges upon a photoreceptor surface of said solid-state electronic imager using a diaphragm which is provided in front of the photoreceptor surface of said solid-state electronic imager;

controlling said diaphragm at a first point in time so as to obtain an opening amount at which parallax is produced in the plurality of images represented by the image data that is output from said solid-state electronic imager, and controlling said diaphragm at a second point in time so as to obtain parallax less than the parallax of the first point in time;

calculating parallax information of the plurality of images using image data representing the plurality of images output from said solid-state electronic imager at said first point in time;

generating planar image data, which represents a planar image, from image data representing the plurality of images output from said solid-state electronic imager at said second point in time; and recording on a recording medium the parallax information generated by said step of calculating parallax information and the planar image data generated by said step of generating planar image data, wherein said solid-state electronic imager includes a number of optoelectronic transducers in the column and row directions, and the right side of the photoreceptor surface of the optoelectronic transducers of the odd-numbered rows is shielded from light, and the left side of the photoreceptor surface of the optoelectronic transducers of the even-numbered rows is shielded from light, or the right side of the photoreceptor surface of the optoelectronic transducers of the even-numbered rows is shielded from light, and the left side of the photo-receptor surface of the optoelectronic transducers of the odd-numbered rows is shielded from light.

11. The stereoscopic imaging apparatus according to claim 1, wherein in said pupil division said plurality of images of different viewpoints are obtained at the same time using said solid-state electronic imager.

12. The stereoscopic imaging apparatus according to claim 1, wherein said solid-state electronic imager utilizes an imaging device comprising:
   optoelectronic transducers whose portions are shielded from light for obtaining an image data representing the image of the subject from the right-eye viewpoint, and optoelectronic transducers whose portions are shielded from light for obtaining an image data representing the image of the subject from the left-eye viewpoint.

13. The stereoscopic imaging method according to claim 10, wherein in said pupil division of said outputting step, said plurality of images of different viewpoints are obtained at the same time using said solid-state electronic imager.

14. The stereoscopic imaging method according to claim 10, wherein said solid-state electronic imager utilizes an imaging device comprising:
   optoelectronic transducers on which the light ray from the right side of the imaged subject impinges, and optoelectronic transducers on which the light ray from the left side of the imaged subject impinges.

* * * * *